US010138756B2

(12) United States Patent
Sahores et al.

(10) Patent No.: US 10,138,756 B2
(45) Date of Patent: Nov. 27, 2018

(54) METHOD FOR DAMPING A GAS-TURBINE BLADE, AND VIBRATION DAMPER FOR IMPLEMENTING SAME

(75) Inventors: Jean-Luc Pierre Sahores, Mazeres-Lezons (FR); Michel Francois Leon Beaucoueste, Arthez d'Asson (FR)

(73) Assignee: Safran Helicopter Engines, Bordes (FR)

( * ) Notice: Subject to any disclaimer, the term of this patent is extended or adjusted under 35 U.S.C. 154(b) by 767 days.

(21) Appl. No.: 13/978,007

(22) PCT Filed: Dec. 20, 2011

(86) PCT No.: PCT/FR2011/053067
§ 371 (c)(1),
(2), (4) Date: Jul. 2, 2013

(87) PCT Pub. No.: WO2012/093217
PCT Pub. Date: Jul. 12, 2012

(65) Prior Publication Data
US 2013/0280068 A1   Oct. 24, 2013

(30) Foreign Application Priority Data
Jan. 4, 2011   (FR) .................................... 11 50042

(51) Int. Cl.
*F01D 5/26*   (2006.01)
*F01D 25/06*   (2006.01)
(Continued)

(52) U.S. Cl.
CPC .............. *F01D 25/06* (2013.01); *F01D 5/22* (2013.01); *F01D 5/26* (2013.01); *F01D 5/3007* (2013.01);
(Continued)

(58) Field of Classification Search
CPC ... F01D 5/22; F01D 5/225; F01D 5/26; F01D 11/008; F01D 25/06; F05D 2260/96
(Continued)

(56) References Cited

U.S. PATENT DOCUMENTS 2,999,631 A * 9/1961 Wollmershauser ..... F01D 5/022
415/79
3,037,741 A    6/1962 Tuft
(Continued)

FOREIGN PATENT DOCUMENTS

EP   0 437 977   7/1991
EP   0 709 549   5/1996
(Continued)

OTHER PUBLICATIONS

International Search Report dated Apr. 18, 2012 in PCT/FR11/053067 Filed Dec. 20, 2011.

*Primary Examiner* — Christopher Verdier
(74) *Attorney, Agent, or Firm* — Oblon, McClelland, Maier & Neustadt, L.L.P.

(57) ABSTRACT

A turbine wheel with optimal-mass dampers to dampen a predetermined resonance in context of vibration of a turbine, particularly a low-speed turbine, while assisting in flexibility of adapting to bearing surfaces of recesses of the dampers, by separating mass and flexibility functions by a flexible portion for clamping against the platform, and a mass portion for controlling frictional forces. A damper includes a plate and a counterweight. The plate is stamped from a metal sheet that is substantially thinner than that of the counterweight. The plate includes a wall configured to flexibly contact a platform of the blade of the wheel, while at least partially surrounding a surface of the counterweight.

(Continued)

The damper can be used in particular for a wheel of a turbine of a turbine engine, of a fan, or of a BP compressor having mounted blades.

14 Claims, 3 Drawing Sheets

(51) Int. Cl.
  *F01D 5/22*    (2006.01)
  *F01D 5/30*    (2006.01)
  *F01D 11/00*   (2006.01)
(52) U.S. Cl.
  CPC ........ *F01D 11/008* (2013.01); *F05D 2260/96* (2013.01); *Y02T 50/671* (2013.01); *Y02T 50/673* (2013.01)
(58) Field of Classification Search
  USPC ........ 415/119; 416/1, 145, 190, 193 A, 248, 416/500
  See application file for complete search history.

(56) References Cited

U.S. PATENT DOCUMENTS

| | | |
|---|---|---|
| 4,177,013 A | 12/1979 | Patterson et al. |
| 5,513,955 A | 5/1996 | Barcza |
| 5,599,170 A | 2/1997 | Marchi et al. |
| 5,827,047 A | 10/1998 | Gonsor et al. |
| 6,171,058 B1 * | 1/2001 | Stec .......... F01D 5/22 416/193 A |
| 2005/0079062 A1 * | 4/2005 | Surace ........ F01D 5/22 416/248 |
| 2006/0056974 A1 | 3/2006 | Beattie |
| 2009/0004013 A1 | 1/2009 | Ramlogan et al. |

FOREIGN PATENT DOCUMENTS

| | | |
|---|---|---|
| EP | 0 816 638 | 1/1998 |
| EP | 1 635 037 | 3/2006 |
| EP | 2 009 247 | 12/2008 |
| FR | 2 376 958 | 8/1978 |

\* cited by examiner

METHOD FOR DAMPING A GAS-TURBINE BLADE, AND VIBRATION DAMPER FOR IMPLEMENTING SAME

TECHNICAL FIELD

The invention relates to a damping method for blades mounted on gas turbine wheels, as well as a vibration damper being adapted to implement such method. In particular, the invention relates to turbine wheels of turbine engines, but can also apply to fans and low pressure compressors with blade inserts.

A gas turbine comprises at least one compressor driving a turbine, which compressor delivers compressed air at the combustion chamber input. The blades of the mobile rotors comprising the turbine stages are submitted to a high temperature rise by contact with the hot gases issued from the chamber after combustion. The hot gases then circulate in a section being channeled by a ring conduct, and drive into rotation the turbine rotor blades arranged within such section.

The blades and the rim of the disks on which they are arranged thus need a drastic cooling. The blade cooling means are generally formed by an air flow circulating in cooling circuits being internal to the blades. The cooling air is coming from outside and/or from an air fraction of a compressor stage associated with a turbine stage. An air circulation around the disks also allows the downstream face of the latter to be cooled.

STATE OF THE ART

The presence of such gas flows and the dynamical excitation of the blade rotation create vibration phenomena. In order to limit such vibrations, the blades are equipped with bearing dampers under blade platforms, the platforms forming the internal meridian line of the air section at the rotor level.

Such dampers are generally shaped as small metal sheets being stamped with more or less important cutoff edges, and the energy generated by the movement of the blades and platforms in vibration is dissipated by a friction of such metal sheets against the platforms. Upon their movements, the metal sheets are clamped against the platforms by the centrifugal forces, the friction phenomenon alternating between sliding phases and adherence phases with the platforms. The more the adaptation between the damper and the platform is provided, the best the damping is. Such resilient friction dampers are described for instance in the patent document FR 2,503,247.

The thickness of the metal sheet, from 0.2 to 0.7 mm, is selected depending on the vibrating conditions of the blade and the dynamical excitation that it can suffer, in particular on looking at the resonance speed thereof. An optimal mass is defined so as to damp a precise resonance of each vibratory context, taking into account the turbine resonance type and the turbine rotation speed range as well as other design criteria (geometry, material, etc.). In particular, in the case of low speed turbines or low pressure air flows, the optimum mass is substantially higher than the high speed turbine one.

Therefore, in the powerful turbine engines with a multistage free turbine having a low mechanical load, the speeds of the so-called low speed turbines (under 30,000 rpm) are substantially lower than the quicker speeds of the single stage turbines (about 35,000 to 45,000 rpm). Moreover, the twin stage turbines have slimmer blades being more numerous (for instance from 40 to 60 blades), and thus less inter-platform space between such blades.

It thus becomes more and more difficult to reach the optimal mass with such technology and thereby to control the friction forces. Furthermore, the use of a thicker metal sheet, for example thicker than 1 mm, when the housing recesses allow it, is harmful to energy dissipation as well as metal sheet flexibility, i.e. to the capacity thereof to be distorted under a centrifugal field, thus to its friction and vibration absorption property. The very localized appearance of wear points, under the platforms, then confirms the bad distribution of the contact areas between the dampers and the platforms.

In such conditions, an incompatibility can be noticed between the respect of the optimum mass that, being defined by the vibratory context, tends to increase in general in the low speed turbines, the damper flexibility and the friction quality thereof. Indeed, the use of thicker and thicker metal sheets, housed in reduced spaces between platforms in the case of low speed turbines, then leads to a degradation of the damper flexibility and of the adaptation to the blade/damper contact and thus to the damping being induced.

DISCLOSURE OF THE INVENTION

The invention aims at removing such incompatibility by providing dampers with an optimum mass adapted to damp a resonance according to a vibratory context of the turbine, in particular for low speed turbines, while assisting in the flexibility of adapting to the bearing surfaces of the housings of the dampers. To do so, the invention envisages separating the mass and flexibility functions.

More precisely, the object of the present invention is to provide a damping method for blades being mounted on gas turbine low speed wheel disks, the turbine having housings under blade platforms, adapted to receive vibration dampers. The method consists in carrying out in an independent way a flexible portion for clamping against the platform and a mass portion for concentrating efforts so as to direct the friction forces against the platform via the clamping action, coupling both parts together in a reversible way and inserting the so-made dampers in two parts within the housings being dedicated.

The coupling of both parts is made by surrounding at least partially the mass portion through at least one clamping area of the flexible portion against the platform. The flexible portion is sufficiently flexible to adapt oneself at the required contact level, for instance to compensate for a non perfect positioning, to adapt oneself to the distribution of the geometries under platform from blade to blade or to neutralize the casting tolerances. The mass portion may be changed through another material mass being different or can be increased with an addition of an extra mass in case of a damping deficit.

The invention also relates to a vibration damper adapted to implement the above-mentioned method. Such a damper comprises a plate and at least one counterweight, the plate being stamped from a metal sheet that is substantially thinner than the counterweight one. Such a plate has a wall capable of flexibly contacting at least one blade platform, in particular the platforms of two adjacent blades, while surrounding at least partially one face of the counterweight.

According to the preferred embodiments:
 the material of the plate is softer than the one of the bearing surface on which it is adapted to come into an adjusted contact;

the plate has at least two bent arms adapted to embrace the counterweight;

the counterweight comprises two piles connected by a central portion, the central portion being adapted to receive the clamping arms of the plate; and the plate has a thickness comprised between 0.1 and 0.6 mm and the counterweight between 1 and 6 mm, preferably between 2 and 3 mm.

SHORT DESCRIPTION OF THE DRAWINGS

Other characteristics and advantages of the invention will appear upon reading of the detailed description of exemplary embodiments hereinbelow, referring to the respective accompanying FIGS., wherein.

DETAILED DESCRIPTION OF AN EMBODIMENT

Referring to the Figs., the words "front" and "rear" refer to the "upstream" and "downstream" elements relative to the direction defined by the central rotation axis X'X.

Figure 1:
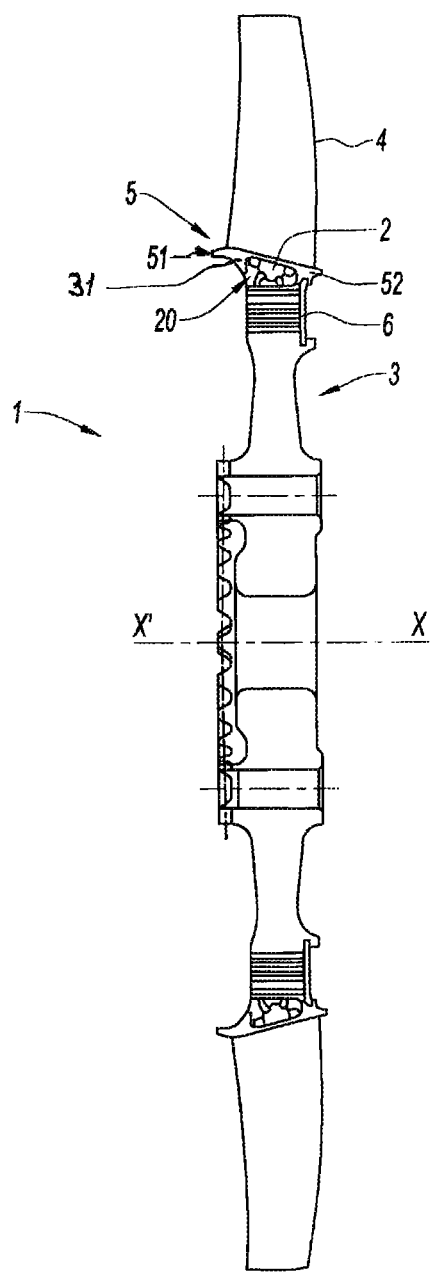
FIG. 1 shows an overall longitudinal section of an example of a turbine wheel equipped with dampers according to the invention.

FIG. 1 generally illustrates the sectional view of a free turbine wheel 1, integrating dampers 2 according to the invention. The wheel 1 presents a cyclic repetitivity according to the turbine axis X'X and comprises a central disk 3 on the periphery of which the fir tree feet of the blades 4 are mounted. Between the fir tree feet and the aerodynamic profiles of the blades 4 the platforms 5 are positioned, the feet being inserted within cavities of the periphery of the disk 3 with a shape being complementary to the foot one. Brake pads 31 of the blades are inserted so as to lock up the feet in their cavities.

Such brake pads can be advantageously substituted according to architectures for other axial braking systems such as lock wires, rivets, lock rings or flanges or equivalent.

Each damper 2 is integrated into a housing 20 bound by one platform 5, two adjacent blade foot stilts 41 and one rear pad 31. The platform 5 presents a profile forming, on the axial end, front and rear axial lock stiffeners 51 and 52 of the damper 2 in the housing thereof.

Figure 2A:
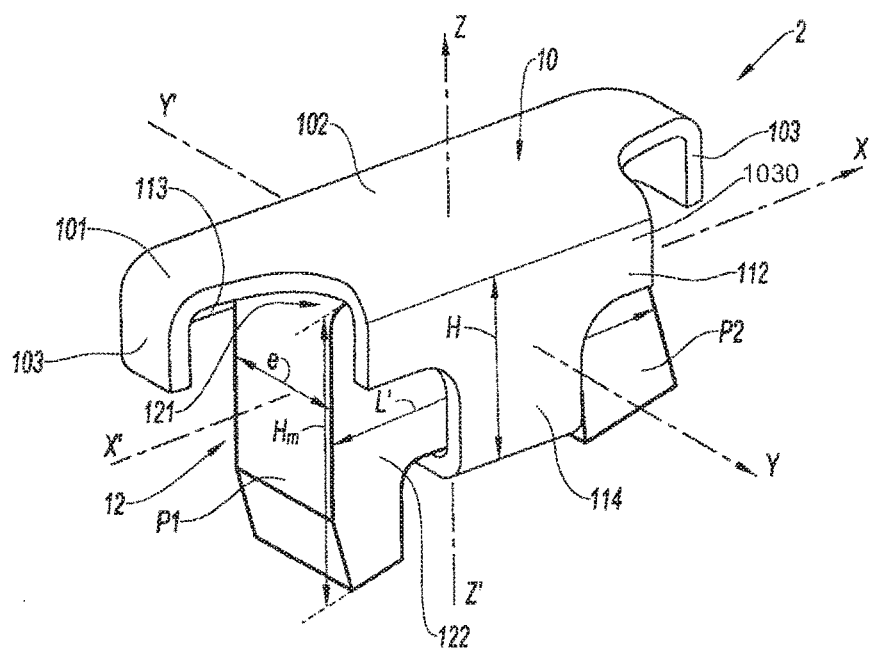
FIGS. 2a and 2b show an exemplary damper comprising a counterweight and a plate, respectively, in a perspective view and in a bottom view.
Figure 2B:
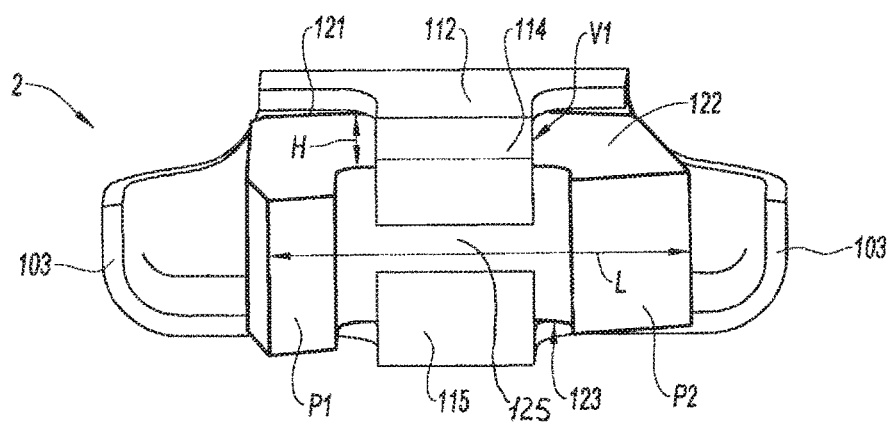

Referring to the views on FIGS. 2a and 2b, an exemplary turbine damper 2 according to the invention is shown more precisely as a combination of a plate 10 of a low thickness, here 0.2 mm, and a counterweight 12 of a substantially bigger thickness, here 3 mm according to the cross thickness thereof "e" and 5 to 6 mm according to the height "H" thereof in its central part.

The plate 10 forms a thin wall partially covering the counterweight 12, and in particular almost the whole said upper face 121 thereof. The maximum height Hm of the plate-counterweight assembly and the overall shape of such assembly are determined so that the latter stays in place between the stiffeners 51 and 52 of the platform 2 (see FIG. 1).

The counterweight 12 is marked out in an own referential being defined by its position within the turbine disk: its central height "H" radially refers to a diameter Z'Z of the disk, its length "L" is parallel to the rotation axis X'X of the turbine and its cross thickness "e" is carried by the tangent Y'Y, at the contact point of the ring sector of the disk rim where the counterweight will be housed. The terminologies of the "upper", "lower", "lateral" or even "upstream"and "downstream" types refer to the counterweight referential.

The counterweight has an overall arched shape comprising two piles P1 and P2 connected by a vault V1, the upper part of which coincides with the upper face 121 of the counterweight. The height of the vault V1 between its upper face 121 and its lower face 125 defines the thickness of the counterweight 12 in the central part thereof.

The plate 10 also presents an upper wall 101 arranged on the upper face 121 of the counterweight 12. The upper face 102 of such wall 101 will be clamped against the platform 5 of the blade under the action of the centrifugal field, once the counterweight 12 being inserted in its housing (see the description referring to FIG. 3) and the turbine in a nominal operation. The thickness of the wall 101 is adjusted to 0.2 mm so that such contact will be sufficiently resilient, the wall being able to be distorted without altering the resilience thereof.

The upper face of the plate 10 has a substantially rectangular shape. It shows two adaptation indentations 103 adapted for the axial braking system with brake pads 31, as illustrated on FIG. 1 or 3. Such indentations can be cancelled with other breaking systems, for example with a lock wire.

Moreover, the upper face 101 is extended by a rim 103 contacting, on its longitudinal sides 112 and 113, the longitudinal faces 122 and 123 of the counterweight 12. The longitudinal sides 112 and 113 of the rim 103 are extended in turn by arms 114 and 115 each including a radially extending portion and a laterally extending portion bent from the radially extending portion, the laterally extending portions of the arms 114 and 115 enclosing the counterweight 12 up to the lower face 125 of the vault V1. The plate is mounted with a clearance around the counterweight. Through this clearance and under the effect of the centrifugal force, the counterweight 12 will be clamped against the plate 10 and, through such mass effect, will bring such plate against the contact area of the blade platform. The plate will be able to be distorted upon such contact and will then exert a flexibility function.

The plate 10 and the counterweight are stamped or cut from metal sheets with adapted thicknesses, i.e. corresponding to the thicknesses respectively determined for the plate and the damper so that the assembly meets to the optimum mass being dimensioned to damp a precise resonance of the wheel as a function of the characteristics thereof. The metal sheet being used is typically a nickel based alloy.

Figure 3:
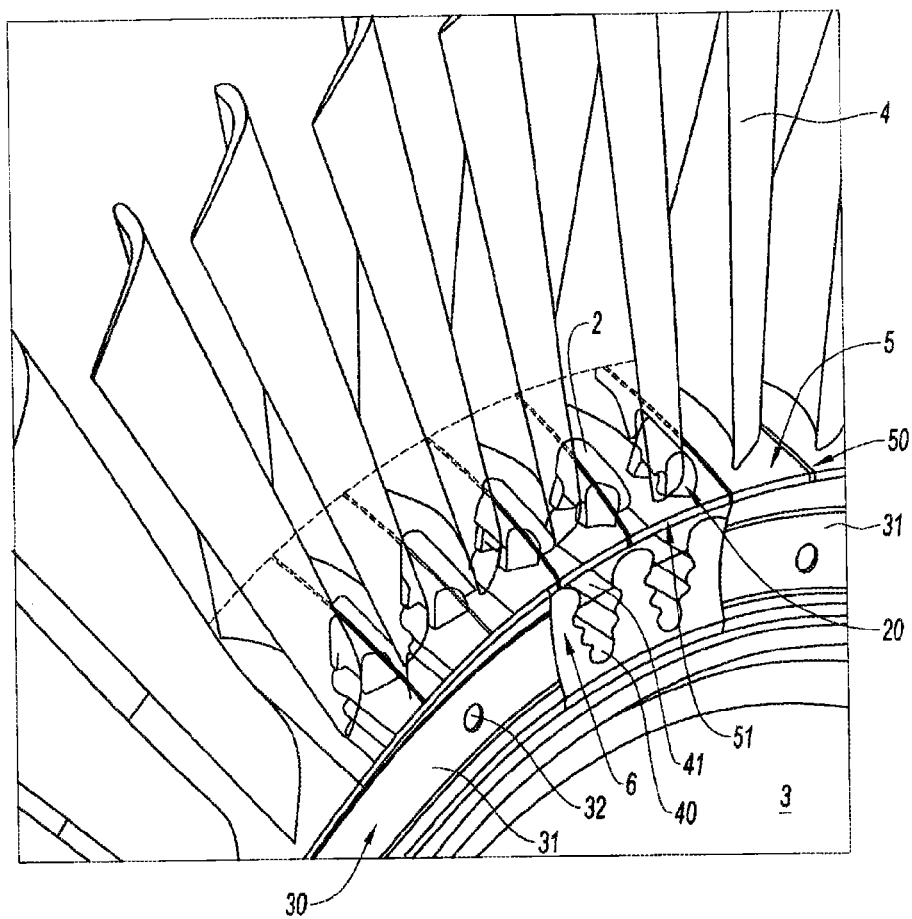
FIG. 3 is a perspective partial view of a turbine wheel equipped with dampers according to the invention.

FIG. 3 illustrates a partial view of the wheel 1, wherein an annular ring 30 of the disk 3 receives the feet 40 of the blades 4 and the dampers 2. The flanks of the ring 30 are closed by the brake pads 31 forming sections being arranged by sliding into grooves formed in the platforms 5 and the ring 30, so as to lock axially the movement of the blade feet 40 in their cavity. The platforms 5 form a ring 50 from which the blades 4 radially extend.

The damper is locked, within its housing or cavity, laterally by the stilt bodies 41 (a fir tree foot top), radially by the platform 5 and axially by the blade stiffeners 51 and 52 (see FIG. 1).

One part of FIG. 3 appears in transparency and a stiffener has been removed so as to best show the dampers 2 and their housings 20. Each housing 20 is formed under the inner faces 51 of two juxtaposed platforms 5, between two stilt bodies 41 of two feet 40 of the blades 4 and a projection or inter blade 6 of the ring 30. The dampers then exert also a sealing function by reducing the inter-platform trailing section between the juxtaposed platforms.

The counterweight 2 axially presents a degree of freedom according to the axis Z'Z and a clearance—for example from $1/10^{th}$ to a few tenths of a millimeter—between the plate 5 and the brake pad and thus, under the action of the centrifugal field, between such pad and the counterweight.

Under the effect of the centrifugal field, the turbine being in rotation, the dampers will be clamped against the inner faces 51 of the platforms 50, the plate 10 being distorted resiliently to be best adapted to the clamping action and the counterweight 12 concentrating all efforts to favor the vibration damping effect by the friction forces, in particular resonance.

The invention is not limited to the exemplary embodiment being described and represented. It is for example possible to provide two dampers per housing in its length or to increase substantially the length of each damper up to substantially the housing one.

Furthermore, the blade feet can be hammer shaped feet, instead of the fir tree shaped feet, the housings of the dampers being still defined by the stilts of such feet.

It is possible to apply the invention on any assembly of parts connected and rotationally mounted in a gas turbine, in particular on any gas turbine of aircrafts, but also on any land or sea gas turbine. Furthermore, the dimensions are adapted for the type and the dimensions of the turbine.

Moreover, the plate or stiffener arms to maintain the counterweight are not indispensable: due to the resiliency of the plate, the plate rim, enclosing totally the lateral faces of the plate, can be sufficient to keep the counterweight in connection with the plate, at least one welding or gluing point enabling manipulation upon mounting.

Furthermore, the housing of the dampers can be arranged differently with respect to the example. Thus, it can be carried out from blade feet of various shapes.

The invention claimed is:

1. A damping method for blades mounted on a low speed wheel disk of a gas turbine, the disk including a housing under a platform of a blade, configured to receive a vibration damper, the method comprising:
providing the vibration damper including a flexible portion including a plate clamped against the platform, and a mass portion including a counterweight for directing friction forces against the platform via clamping, the flexible portion and the mass portion being coupled together in a reversible way by surrounding at least partially the mass portion through at least one clamping area of the flexible portion against the platform, the flexible portion being sufficiently flexible to be configured to a required contact level; and
inserting the vibration damper within the housing,
wherein the plate includes an upper wall which abuts an uppermost face of the counterweight and is configured to flexibly contact the platform of the blade,
wherein the counterweight is free of contact with the platform, and
wherein the counterweight includes first and second piles connected by a central portion, the uppermost face of the counterweight being provided on the central portion.

2. The vibration damper for the low speed wheel disk of the gas turbine for implementing the blade damping method according to claim 1, wherein the plate is stamped from a metal sheet that is substantially thinner than a metal sheet from which the counterweight is stamped.

3. The vibration damper according to claim 2, wherein the upper wall of the plate is configured to come in contact with platforms of two adjacent blades.

4. The vibration damper according to claim 3, wherein a material of the plate is softer than a material of a bearing surface of the platform.

5. The vibration damper according to claim 2, wherein the plate includes at least two bent arms configured to embrace the counterweight.

6. The vibration damper according to claim 2, wherein the central portion is configured to receive the arms of the plate.

7. The vibration damper according to claim 2, wherein the plate has a thickness between 0.1 and 0.6 mm and the counterweight has a thickness between 1 and 6 mm, or between 2 and 3 mm.

8. A damping method for blades mounted on a low speed wheel disk of a gas turbine, the disk including a housing under a platform of a blade, configured to receive a vibration damper, the method comprising:
providing the vibration damper including a flexible portion including a plate clamped against the platform, and a mass portion including a counterweight for directing friction forces against the platform via clamping, the flexible portion and the mass portion being coupled together in a reversible way by surrounding at least partially the mass portion through at least one clamping area of the flexible portion against the platform, the flexible portion being sufficiently flexible to be configured to a required contact level; and
inserting the vibration damper within the housing,
wherein the plate includes an upper wall arranged on an upper face of the counterweight and configured to flexibly contact the platform of the blade, a rim extended from the upper wall and including first and second longitudinal sides which respectively abut first and second longitudinal sides of the counterweight, and first and second arms which are respectively extended from the first and second longitudinal sides, and
wherein each of the first and second arms includes a radially extending portion and a laterally extending portion bent from the radially extending portion, the laterally extending portions of the first and second arms enclosing a lower face of the counterweight.

9. The blade damping method according to claim 8, wherein the plate is stamped from a metal sheet that is substantially thinner than a metal sheet from which the counterweight is stamped.

10. The blade damping method according to claim 8, wherein the upper wall of the plate is configured to come in contact with platforms of two adjacent blades.

11. The blade damping method according to claim 10, wherein a material of the plate is softer than a material of the bearing surface of the platform.

12. The blade damping method according to claim 8, wherein the counterweight comprises two piles connected by a central portion, the central portion configured to receive the first and second arms of the plate.

13. The blade damping method according to claim 8, wherein the plate has a thickness between 0.1 and 0.6 mm and the counterweight has a thickness between 1 and 6 mm, or between 2 and 3 mm.

14. The blade damping method according to claim 8, wherein a lateral gap is provided between free ends of the laterally extending portions of the first and second arms, and a radial gap is provided between the lower face of the counterweight and the radially extending portions of the first and second arms.

\* \* \* \* \*

UNITED STATES PATENT AND TRADEMARK OFFICE
CERTIFICATE OF CORRECTION

PATENT NO. : 10,138,756 B2
APPLICATION NO. : 13/978007
DATED : November 27, 2018
INVENTOR(S) : Jean-Luc Pierre Sahores et al.

Page 1 of 1

It is certified that error appears in the above-identified patent and that said Letters Patent is hereby corrected as shown below:

In the Specification

Column 4, Line 27, change "rim 103" to --rim 1030--;

Column 4, Line 30, change "rim 103" to --rim 1030--; and

In the Claims

Column 6, Line 10, change "claim 2" to --claim 5--.

Signed and Sealed this
Eighth Day of October, 2019

Andrei Iancu
*Director of the United States Patent and Trademark Office*